R. J. NICHOLS.
MOTOR VEHICLE.
APPLICATION FILED MAY 29, 1911.
1,045,067.
Patented Nov. 19, 1912.
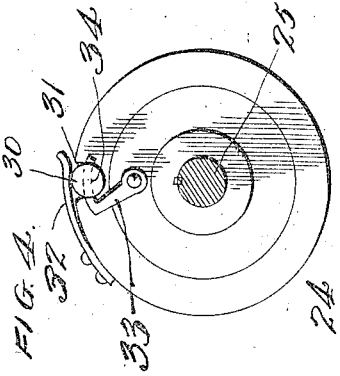
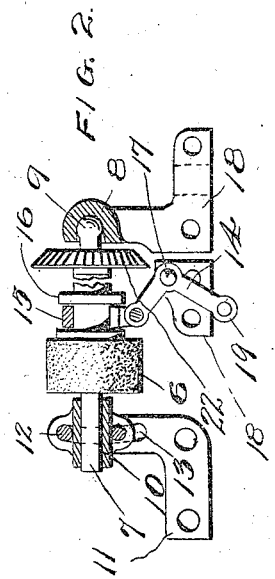
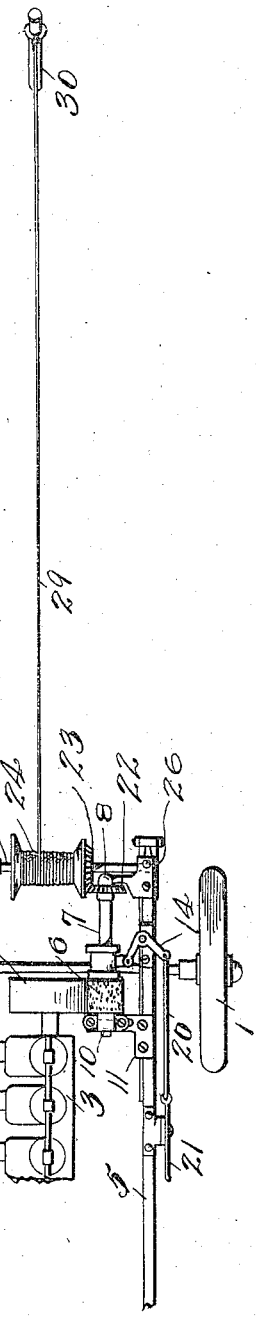
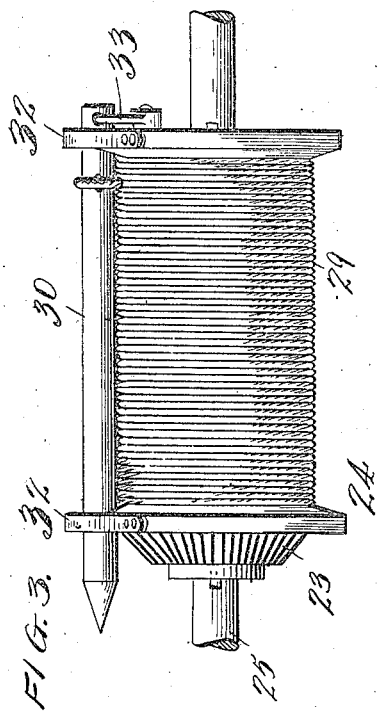
WITNESSES
Chas. K. Davis.
E. A. Jordan.
INVENTOR
R. J. Nichols
By Thomas K. Harvey
Attorney

UNITED STATES PATENT OFFICE.

ROBERT J. NICHOLS, OF BERLIN, GEORGIA.

MOTOR-VEHICLE.

1,045,067.  Specification of Letters Patent.   Patented Nov. 19, 1912.

Application filed May 29, 1911. Serial No. 630,169.

*To all whom it may concern:*

Be it known that I, ROBERT J. NICHOLS, a citizen of the United States, residing at Berlin, in the county of Colquitt and State of Georgia, have invented certain new and useful Improvements in Motor-Vehicles, of which the following is a specification.

The present invention relates to improvements in motor vehicles, and is designed as a special driving device therefor.

The object of the invention is the provision of mechanism which is simple in operation, for extricating automobiles from stalled positions, due to the condition of bad roads or highways.

By means of my device I am enabled to pull a stalled automobile from its position, with little loss of time, and comparatively slight trouble, by power from the engine of the automobile.

Further merits and advantages of the invention will be apparent from the disclosure in the following specification taken in connection with the drawings.

In the accompanying drawings I have illustrated one example of the physical embodiment of my invention constructed according to the best mode I have so far devised for the practical application of the principles.

Figure 1 illustrates so much of an automobile as is necessary to exemplify my invention, with the novel features of the invention disclosed therewith. Fig. 2 is an enlarged detail view partly in section, of a shiftable counter shaft and connections, forming part of the invention. Fig. 3 is an enlarged view showing a drum with a stake attached thereto, and Fig. 4 is an end view of Fig. 3.

My invention is applicable for use in connection with any of the standard types of automobiles, and as an exemplification I have illustrated in Fig. 1 a portion of an automobile comprising the front wheels 1, the axle 2, engine 3, and fly wheel 4, these parts being supported as usual on the frame 5.

In the preferred embodiment of the invention, the attachment is operated from the fly wheel 4 of the engine 3, and to this end I provide a friction wheel 6, journaled on the counter shaft 7, which shaft is supported at one end in the circular bearing 8, a spherical head 9 being seated in the bearing. The other end of the shaft is supported in bearing block 10. The shaft and block are movable, the block being slidably supported on the bracket 11 which is attached to the car frame, as shown, and the block may be secured in the bracket by means of bolts 12, which are passed through and movable in the guide slot 13 in the bracket.

The shaft 7 is movable on its end bearing 9 as a pivot, and to accomplish this movement I utilize the bell crank lever 14 which is attached at one end to a sleeve 15 which surrounds the collar 16 on the shaft 7. The lever 14 is pivoted at 17 on the bracket 18, and its free end 19 has connected thereto the draw rod 20, which is in turn pivoted to the shift lever 21 pivotally supported upon the frame of the automobile.

A bevel driving gear 22 is carried on the shaft 7 and this gear is adapted to drive the complementary gear 23 secured on the drum 24, which latter is splined on the transverse shaft 25. Shaft 25 is supported at the front of the automobile in bearings secured to the frame of the machine, as at 26, 26, and a ratchet wheel 27, and pawl 28 are provided to prevent reverse movement of the shaft, as will be described.

A cord or rope 29 is adapted to wind and unwind about the drum, and a metallic stake or peg 30 is also a part of the equipment of the device. For convenience in carrying the stake and preventing the unwinding of the rope, I provide recesses 31 in the heads of the drum, for the reception of the stake, and flat springs 32 serve to hold the stake within the recesses, while the pivoted pawl 33, which is passed through an opening 34 in the end of the stake, prevents lateral displacement thereof. While not in use, the rope is held in position on the drum, by means of the retained stake, as shown in Fig. 3. In this position the parts are out of the way and do not interfere with the movement of the automobile.

Should the machine become stalled in a sandy or muddy road, the stake, with the rope attached thereto, is freed from the drum, and carried a suitable distance ahead of the machine, and there driven into the road. The counter shaft 7, which in normal condition, is held away from operative position by the lever 21, is now moved by said lever into the position shown in Fig. 1, with the friction wheel in engagement with the fly wheel of the automobile, and the bearing block 10 held by its bolts. The engine is now started, and the motion of the fly wheel is transmitted through the friction wheel, shaft 7, and the bevel gears to the winding drum. The rotation of the drum causes the rope to wind thereon, and the machine is pulled toward the stake, thus extricating the vehicle from the sandy or muddy roadbed.

From the above description taken in connection with the drawings it is evident that I have provided a device or attachment for automobiles which fulfils the purposes or objects set forth, and while I have illustrated one complete example of the invention, it will of course be understood that I may alter the construction thereof within the scope of the following claim.

Having thus fully described my invention, what I claim as new and desire to secure by Letters Patent is:—

The combination with the frame and fly wheel of an automobile, of a shaft having a spherical head and bearing therefor, and a second bearing including a movable block for the shaft; a friction wheel, a collar, and a sleeve on the shaft and actuating means attached to said sleeve whereby the friction wheel may be moved into engagement with the fly wheel; a second shaft, a winding drum thereon, and a pair of bevel gears connecting the two shafts.

In testimony whereof I affix my signature in presence of two witnesses.

ROBERT J. NICHOLS.

Witnesses:
C. E. DAVIS,
FLAVIUS A. ALDERMAN.